US010458415B2

(12) United States Patent
Knapp et al.

(10) Patent No.: US 10,458,415 B2
(45) **Date of Patent: *Oct. 29, 2019**

(54) THREADED CONNECTION FOR TANDEM MOTORS OF ELECTRICAL SUBMERSIBLE PUMP

(71) Applicant: BAKER HUGHES, A GE COMPANY, LLC, Houston, TX (US)

(72) Inventors: John M. Knapp, Claremore, OK (US); John Jay Mack, Catoosa, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/898,767

(22) Filed: Feb. 19, 2018

(65) Prior Publication Data

US 2018/0172008 A1 Jun. 21, 2018

Related U.S. Application Data

(62) Division of application No. 14/802,576, filed on Jul. 17, 2015, now Pat. No. 10,030,662.

(Continued)

(51) Int. Cl.
*F16L 13/08* (2006.01)
*F04D 13/08* (2006.01)

(Continued)

(52) U.S. Cl.
CPC .......... *F04D 13/086* (2013.01); *E21B 43/128* (2013.01); *F04D 13/062* (2013.01);

(Continued)

(58) Field of Classification Search
CPC ........ F04D 13/10; F04D 13/08; F04D 13/086; F04D 13/0633; F04D 29/041;

(Continued)

(56) References Cited

U.S. PATENT DOCUMENTS 4,209,193 A * 6/1980 Ahlstone ............... E21B 17/046 285/24
4,409,504 A 10/1983 Wilson (Continued)

OTHER PUBLICATIONS

U.S. Appl. No. 14/683,557, filed Apr. 10, 2015 "Below Motor Equalizer of Electrical Submersible Pump and Method for Filling".

(Continued)

*Primary Examiner* — Kenneth J Hansen
(74) *Attorney, Agent, or Firm* — Bracewell LLP; James E. Bradley

(57) ABSTRACT

An electrical submersible pump assembly has modules including a pump, at least one motor, and a pressure equalizer coupled to the motor. First and second ones of the modules have a threaded connection including a first adapter having threads. A second adapter mounted to the second module has a tubular body, a neck of smaller diameter than the body, an external shoulder at a base of the neck, a rim on the neck, and an external groove between the external shoulder and the rim. A collar is rotatably carried and axially movable on the neck, the collar being in threaded engagement with the threads of the first adapter, the collar having an internal groove. A split shoulder ring carried partly in the external groove and partly in the internal groove retains the collar on the neck and is biased into one of the grooves.

9 Claims, 5 Drawing Sheets

Related U.S. Application Data

(60) Provisional application No. 62/032,293, filed on Aug. 1, 2014.

(51) Int. Cl.

| | |
|---|---|
| ***E21B 43/12*** | (2006.01) |
| ***F04D 13/06*** | (2006.01) |
| ***F04D 29/054*** | (2006.01) |
| ***F04D 13/10*** | (2006.01) |
| ***F04D 29/60*** | (2006.01) |

(52) U.S. Cl.

CPC ......... *F04D 13/0693* (2013.01); *F04D 13/10* (2013.01); *F04D 29/054* (2013.01); *F04D 29/605* (2013.01); *F05D 2250/281* (2013.01)

(58) Field of Classification Search

CPC ............... F04D 29/0413; F04D 29/044; F04D 29/0513; F04D 29/628; F04D 29/2266; F04D 25/06; E21B 17/046; E21B 17/042; E21B 17/085; F16L 37/10; F16L 37/101; F16L 37/088; F16L 37/107; F16L 15/08; F16L 19/07; F16L 19/005

USPC ....................................... 285/54, 34, 39, 387

See application file for complete search history.

(56) References Cited

U.S. PATENT DOCUMENTS

| | | | | |
|---|---|---|---|---|
| 6,557,905 | B2 | 5/2003 | Mack et al. | |
| 7,611,338 | B2 | 11/2009 | Swatek et al. | |
| 2002/0175519 | A1 * | 11/2002 | Mack .................... | F04D 29/044 285/330 |
| 2012/0257998 | A1 | 10/2012 | Parmeter et al. | |
| 2013/0340245 | A1 | 12/2013 | Watson et al. | |
| 2016/0032928 | A1 | 2/2016 | Knapp et al. | |

OTHER PUBLICATIONS

U.S. Appl. No. 14/660,618, filed Mar. 17, 2015 "Tandem Thrust Bearing with Resilient Bearing Support".

U.S. Appl. No. 14/584,017, filed Dec. 29, 2014 "Threaded Connection Having Different Upper and Lower Threads for Submersible Well Pump Modules".

U.S. Appl. No. 14/585,949, filed Dec. 30, 2014 "Threaded Connectors Between Submersible Well Pump Modules".

U.S. Appl. No. 14/341,352, filed Jul. 25, 2014 "Neck Clamp for Electrical Submersible Pump and Method of Installation".

* cited by examiner

THREADED CONNECTION FOR TANDEM MOTORS OF ELECTRICAL SUBMERSIBLE PUMP

CROSS REFERENCE TO RELATED APPLICATION

This application is a divisional of Ser. No. 14/802,576, filed Jul. 17, 2015, which claimed priority to provisional application Ser. No. 62/032,293, filed Aug. 1, 2014.

FIELD OF THE DISCLOSURE

This disclosure relates in general to electrical submersible pumps for wells and in particular to a threaded connection between tandem motors.

BACKGROUND

Electrical submersible pumps (ESP) are widely used to pump well fluid from hydrocarbon producing wells. A typical ESP includes a centrifugal pump driven by an electrical motor. A seal section or pressure equalizer normally connects between the pump and the motor to reduce a pressure differential between well fluid on the exterior of the ESP and motor lubricant in the motor. In addition to a pump, motor, and pressure equalizer, the ESP may include other modules, such as a gas separator or and additional tandem motor.

The modules of a typical ESP are connected by bolts that extend through external flanges at the upper and lower ends of each module. More recently, threaded connections between the various modules have been introduced. A threaded connection employs a rotatable collar with internal threads mounted to a neck. The collar engages external threads of an adapter of the adjacent module and bears against a shoulder ring. While threaded connections work well, improvements are desired.

For example, a threaded connection between a motor and a pressure equalizer and a threaded connection between a pressure equalizer and a pump would normally not involve electrical terminal connections as well. Connections between tandem motors do include electrical terminal connections, reducing available space for the components of a threaded connection. Prior art shoulder rings for threaded connections occupy a larger space than is readily available for connections between tandem motors.

SUMMARY

An electrical submersible pump assembly has a plurality of modules including a pump, at least one motor, and a pressure equalizer coupled to the motor for reducing a pressure differential between lubricant in the motor and hydrostatic pressure of well fluid. A drive shaft subassembly extends from the motor into the pump along a longitudinal axis of the pump assembly. A threaded connection between first and seconds ones of the modules has a first adapter mounted to the first one of the modules and having threads. A second adapter mounted to the second one of the modules has a tubular body, a neck of smaller diameter than the body extending from the body, an external shoulder at a base of the neck, a rim on the neck, and an external groove between the external shoulder and the rim. A collar rotatably carried and axially movable on the neck is in threaded engagement with the threads of the first adapter. The collar has an internal groove. A shoulder ring is carried partly in the external groove and partly in the internal groove to retain the collar on the neck. The shoulder ring is split and biased into one of the grooves.

In the preferred embodiment, one of the grooves has a shallower depth portion and an adjoining deeper depth portion. The shoulder ring is biased into the other of the grooves. The collar has a disengaged position wherein the deeper depth portion is aligned with said other of the grooves and the shallower depth portion is misaligned with said other of the grooves, and an engaged position wherein the shallower depth portion is aligned with said other of the grooves and the deeper depth portion is misaligned with said other of the grooves. The shoulder ring is located partly in the deeper depth portion and the other of the grooves while the collar is in the disengaged position, and slides axially into the shallower depth portion while the collar moves axially to the engaged position.

In the embodiment shown, the external groove is the groove having a shallower depth portion and an adjoining deeper depth portion. The shoulder ring is biased radially outward relative to the axis.

A release hole may extend radially from an exterior of the collar into the internal groove. The shoulder ring is contractible in response to a tool inserted into the release hole and pressed radially inward against the shoulder ring. When in a fully contracted position, an outer diameter of the ring is located radially inward from the internal groove to enable the collar to be axially removed from the neck.

In the preferred embodiment, the lower and the upper ones of the modules are filled with a lubricant. A coupling sleeve having internal splines engages a lower end of the upper shaft and an upper end of the lower shaft. The coupling sleeve is axially movable between a lower position prior to connecting the lower and upper ones of the modules, and an upper position when the lower and upper ones of the modules are connected. The coupling sleeve is located in a bore in the upper one of the modules. A gasket in a lower end of the bore is sealingly engaged by the coupling sleeve while the coupling sleeve is in the lower position to block leakage of lubricant from the upper one of the modules prior to connecting the upper and lower ones of the modules. The coupling sleeve is spaced above the gasket while in the upper position to communicate lubricant from the upper one of the modules past the gasket into the lower one of the modules.

The threaded connection shown is located between upper and lower tandem motors. Each of the upper and lower tandem motors has a plurality of motor wires terminating in electrical connectors at the lower end of the upper tandem motor and the upper end of the lower tandem motor. A thrust bearing support member in the lower tandem motor has a central counterbore. A thrust bearing is located in the counterbore of the thrust bearing support member. A plurality of motor wire holes extend axially through the thrust bearing support member and are spaced radially outward from the counterbore. The motor wires of the lower tandem motor extend through the motor wire holes. A plurality of slots extend radially from the motor wire holes to the counterbore. Each of the slots has an axial length at least equal to an axial length of each of the motor wire holes. Each of the slots has a width greater than a diameter of each of the motor wires of the lower tandem motor. Preferably, a tube extends through each of the motor wire holes. Each of the more wires of the lower tandem motor extend through one of the tubes. Each of the tubes has an outer diameter greater than the width of each of the slots.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
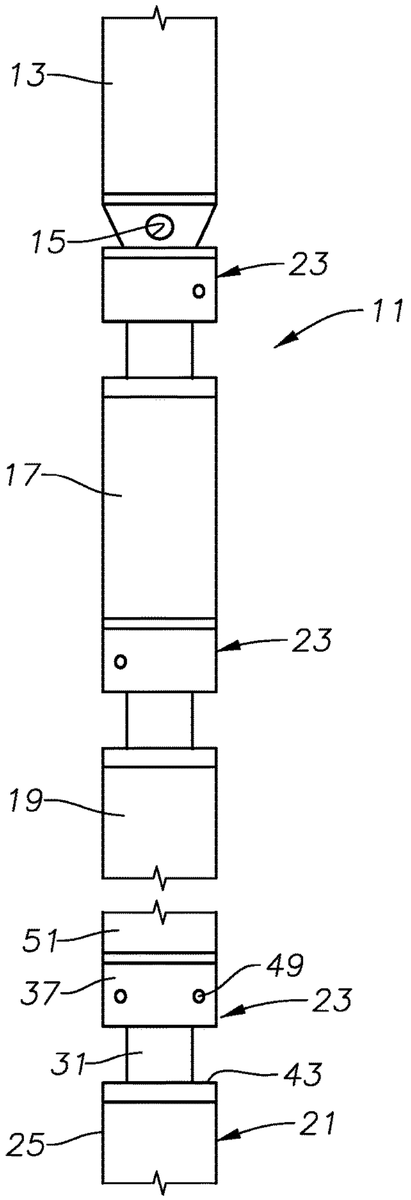
FIG. 1 is a side view of an electrical submersible pump assembly in accordance with this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, electrical submersible pump (ESP) 11 is employed to pump well fluid, typically a mixture of oil and water. ESP 11 may be installed in a vertical portion or a horizontal or inclined portion of a well. The terms “upper”, “lower” and the like are used only for convenience and not in a limiting manner.

ESP 11 has a number of modules, including a pump 13 that may be a centrifugal pump having a large number of stages, each stage having an impeller and a diffuser (not shown). Alternately, pump 13 may be another type, such as a progressing cavity pump. Pump 13 has an intake 15 for drawing in well fluid. A pressure equalizer or seal section 17 connects to the lower end of intake 15 in this embodiment. In this example, upper and lower tandem motors 19, 21 are shown, but only one is feasible. Upper tandem motor 19 connects to the lower end of seal section 17, and lower tandem motor 21 connects to the lower end of upper tandem motor 19. Seal section 17 may be conventional and has components for reducing a pressure difference between lubricant in motors 19, 21 and the hydrostatic pressure of the well fluid. Seal section 17 optionally could connect to a lower end of lower tandem motor 21.

Figure 2:
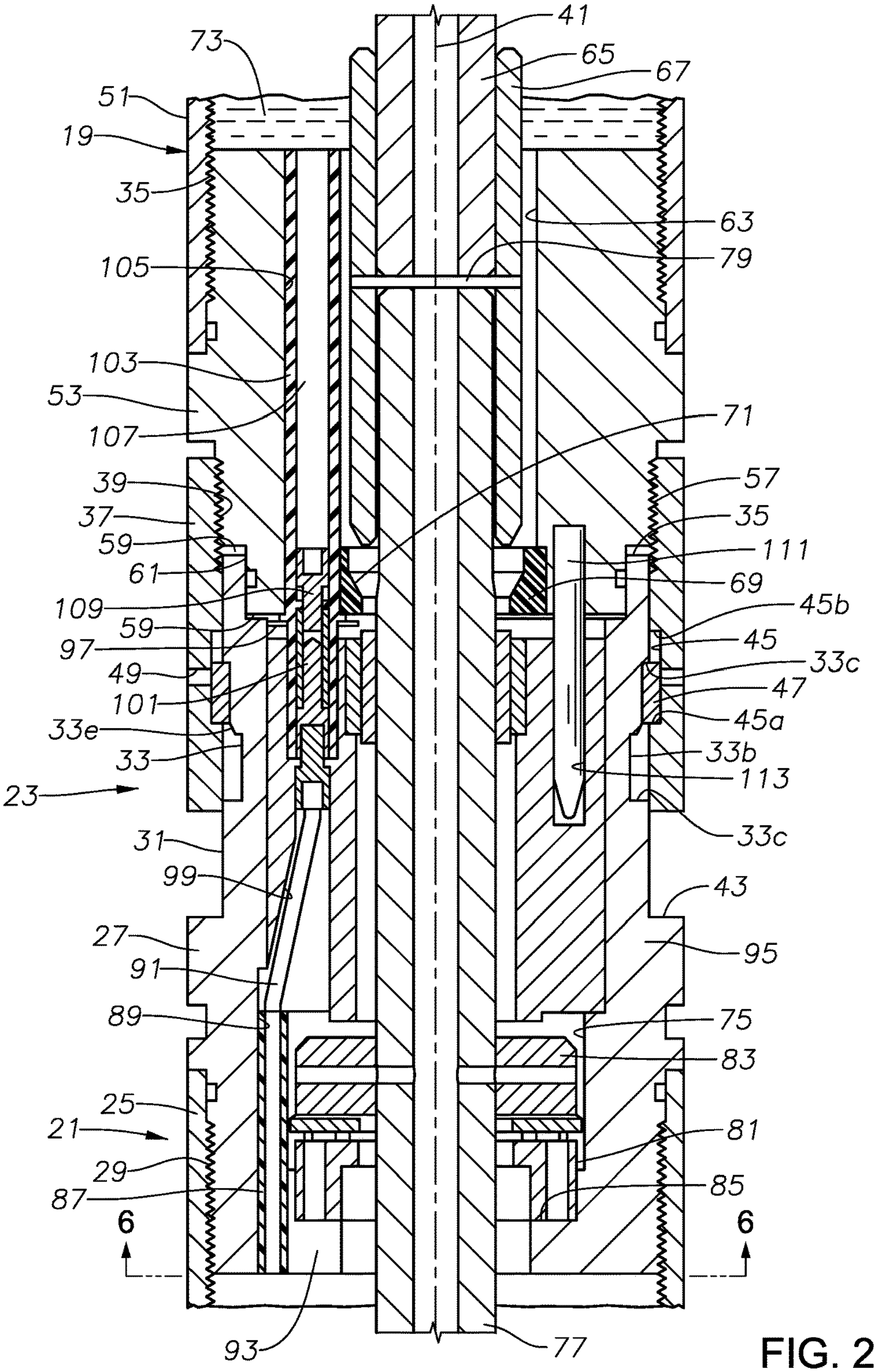
FIG. 2 is a cross sectional view of the threaded connection between the tandem motors of the pump assembly of FIG. 1.

The various modules, including pump 13, seal section 17, and motors 19, 21 are typically brought separately to a well site and connected together. At least one connection 23, and in this example, each of the connections 23, comprises a threaded connection. However, some of the connections between modules could be bolted types. FIG. 2 illustrates the threaded connection 23 between upper tandem motor 19 and lower tandem motor 21; the other threaded connections 23 may be constructed in the same manner.

Referring to FIG. 2, lower motor 21 has a tubular housing 25. An adapter or head 27 has external threads 29 that secure to internal threads in the upper end of housing 25. Lower motor head 27 has an upward protruding neck 31 of smaller diameter than lower motor housing 25. Neck 31 has an annular external groove 33, which has an upper shallower portion **33*a* and a lower deeper portion 33*b*. A downward facing shoulder 33*c* defines the upper end of groove 33, and an upward facing shoulder 33*d* defines the lower end of groove 33. A tapered section or chamfer 33*e* separates upper portion 33*a* from lower portion 33*b***.

Figure 4:
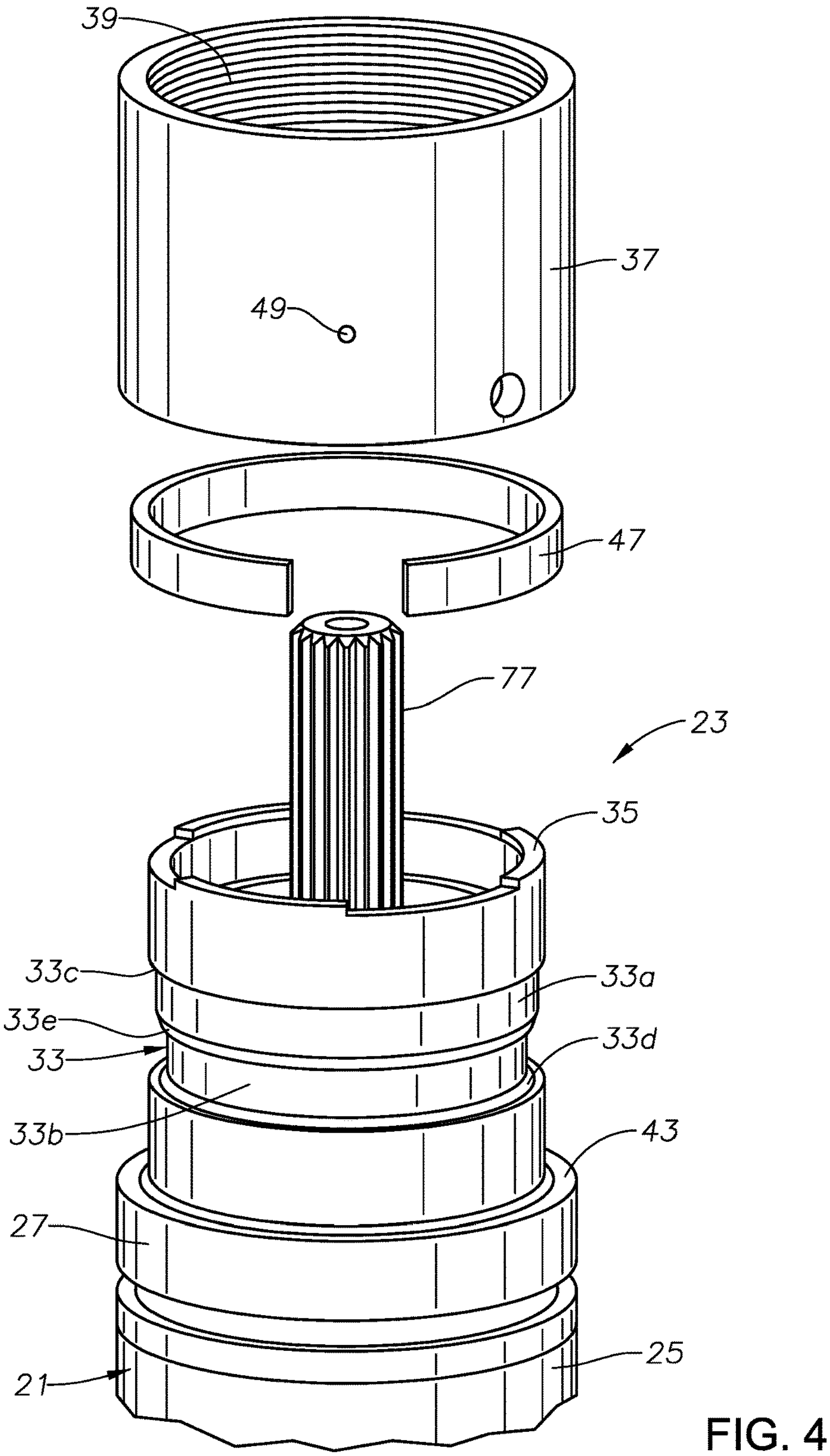
FIG. 4 is a perspective view of the shoulder ring and threaded collar being installed on the head of the lower tandem motor.

Referring to FIG. 4, castellations 35 are located on the upper end or rim of lower motor head 27. Castellations 35 comprise circumferentially spaced apart ridges formed on the rim, each castellation 35 having a flat upper surface and extending a selected circumferential distance. Castellations 35 could be evenly spaced or, if desired to force a particular orientation, they could be asymmetrically distributed around the rim. In this example, three castellations 35 are shown, but the number could differ. Each castellation 35 has a center 120 degrees from the others.

Figure 3:
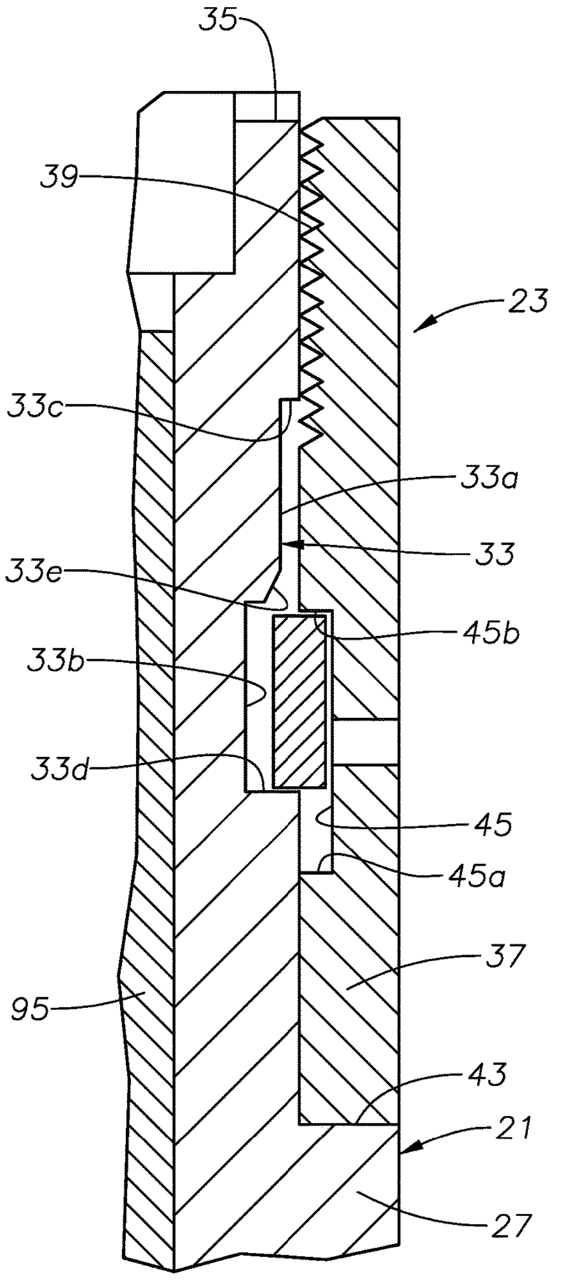
FIG. 3 is a quarter sectional view of the collar and neck of the threaded connection of FIG. 2, showing the collar in a lower released position.

Referring to FIGS. 2 and 3, a collar 37 surrounds neck 31. Collar 37 comprises a sleeve with internal threads 39 at its upper end. Collar 37 is axially movable along axis 41 and rotatable relative to neck 31. Collar 37 has an outer diameter that may be the same as the outer diameter of lower motor housing 25. Collar 37 has a lower released position, which is shown in FIG. 3, with its lower end abutting an upward facing shoulder 43 on lower motor head 27. Collar 37 has an upper engaged position, shown in FIG. 2, with its lower end spaced above shoulder 43. Collar 37 has an annular internal groove 45 that registers with neck external groove 33. Internal groove 45 has an upward facing shoulder **45*a* and a downward facing shoulder 45*b*. In this example, internal groove 45 has a constant depth. Internal groove 45 may have an axial length less than external groove 33**.

A split ring or shoulder ring 47 fits partly in external groove 33 and partly in internal groove 45 to retain collar 37 on neck 31. As shown also FIG. 4, shoulder ring 47 is a single piece member with a split to allow ring 47 to expand radially from a contracted position. Shoulder ring 47 has a natural outer diameter that is preferably slightly greater than the inner diameter of internal groove 45. As a result, shoulder ring 47 is biased outward against the cylindrical wall of internal groove 45. In this example, shoulder ring 47 has an axial dimension from an upper edge to a lower edge that is less than the axial dimension of internal groove 45. While collar 37 is in the upper position of FIG. 2, internal groove upward facing shoulder 45*a* abuts the lower edge of shoulder ring 47. While collar 37 is in the lower position of FIG. 3, downward facing shoulder 45*b* abuts the upper edge of collar 37.

A plurality of release holes 49 extend radially through collar 37 into internal groove 45. While collar 37 is in the lower released position, inserting pointed tools (not shown) into release holes 49 will cause shoulder ring 47 to radially contract if it is desired to remove collar 37 from neck 31.

As illustrated in FIG. 4, the natural inner diameter of shoulder ring 47 is slightly larger than the outer diameter of neck 31 above external groove 33, enabling a worker to slide shoulder ring 47 over neck 31 and place it around internal groove deeper portion 33*b*. The worker then radially contracts shoulder ring 47 within internal groove deeper portion 33*b* so that the outer diameter of shoulder ring 47 while contracted is less than the inner diameter of collar 37 below internal groove 45. Various tools, such as a band or tape, may be used to hold shoulder ring 47 in the contracted position while the worker lowers collar 37 over neck 31. Once the lower end of collar 37 overlaps shoulder ring 47, the tool retaining shoulder ring 47 contracted may be removed. Continued downward movement of collar 37 causes shoulder ring 47 to spring out into engagement with collar internal groove 45, as shown in FIG. 3. Lower motor 19 may be transported while collar 37 is in the lower position shown in FIG. 3.

Referring still to FIG. 2, upper motor 19 has a housing 51 that secures to an adapter or base 53 by upper external threads 55 on base 53. Base 53 has lower external threads 57 that are engaged by collar internal threads 39 when collar 37 is in the upper connected position. Base 53 has a cylindrical nose 61 that inserts into an upper end of neck 31. Castellations 59 on the lower end of nose 61 mate with castellations 35 on the rim of neck 31 to prevent rotation of upper motor 19 relative to lower motor 21.

To connect lower motor 21 to upper motor 19, a worker stabs nose 61 into neck 31, and registers castellations 59 with spaces between castellations 35. The worker then lifts collar 37 from the lower position shown in FIG. 3 and rotates collar 37 to cause threads 39, 57 to make up. Internal groove upward facing shoulder 45*a* lifts shoulder ring 47, causing it to slide upward past chamfer 33*e* into external groove shallow portion 33*a*. While collar 37 is in the upper position, internal groove upward facing shoulder 45*a* bears against the lower edge of shoulder ring 47, and external groove downward facing shoulder 33*c* bears against the upper edge of shoulder ring 47. An axial load from lower motor 21 to upper motor 19 transfers through shoulder ring 47. The radial thickness of shoulder ring 47 is only slightly less than the radial dimension from external groove 33 to internal groove 45 measured at external groove shallow portion 33*a*.

To disconnect motors 19, 21 from each other, a worker rotates collar 37 in the opposite direction to unscrew threads 39, 57. Collar 37 moves downward, causing internal groove downward facing shoulder 45*b* to push shoulder ring 47 downward past chamber 33*e* into external groove deeper portion 33*b*.

Figure 5:
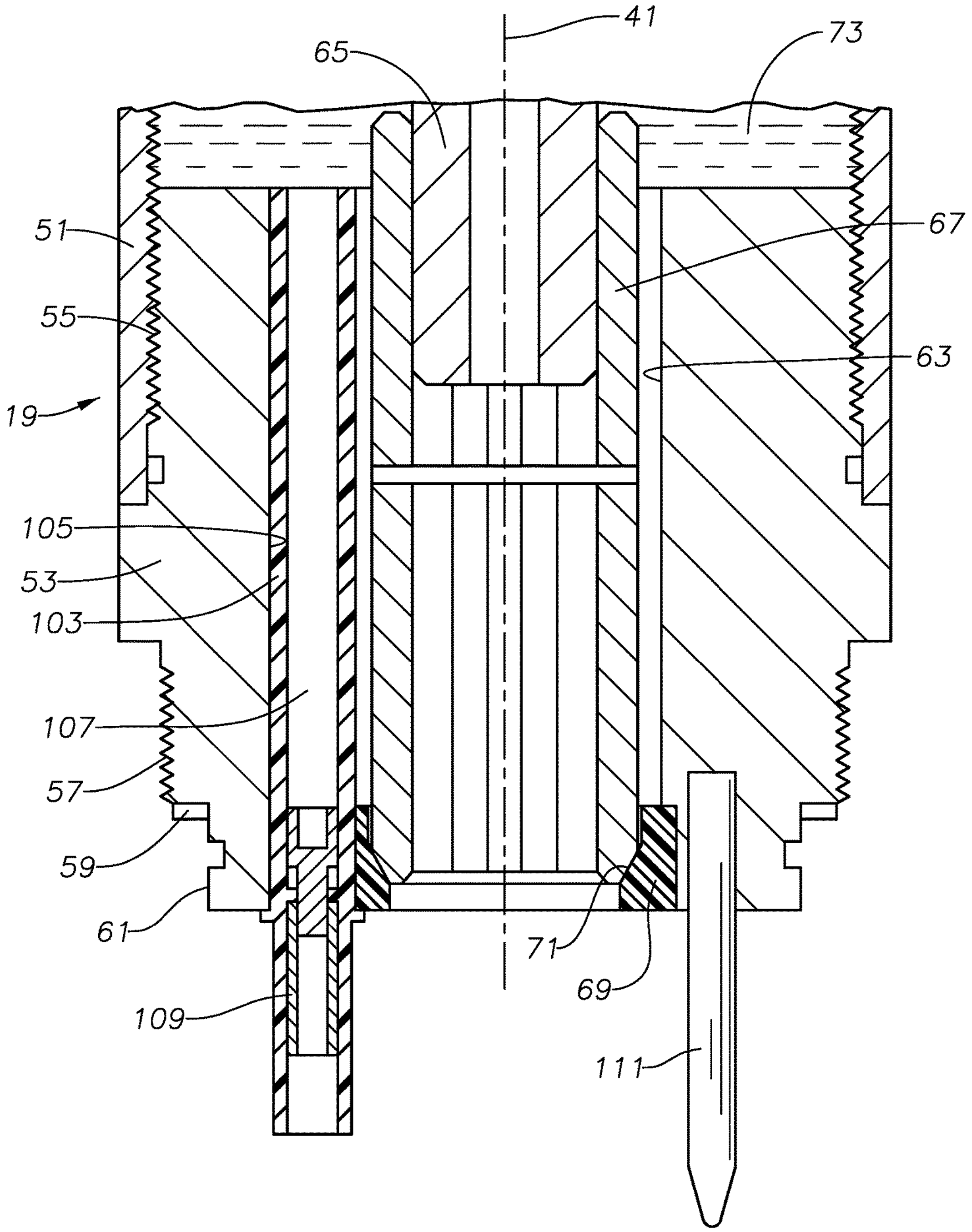
FIG. 5 is a sectional view of the base of the upper motor, shown detached from the lower motor.

Upper motor 19 has an axially extending bore 63 and an upper motor shaft 65 extending axially within bore 63. Upper motor shaft 65 rotates about axis 41 and is axially fixed. A coupling sleeve 67 has internal splines 68 (FIG. 5) that mate with external splines on the lower end of upper motor shaft 65. A circular gasket 69 sealing engages bore 63 at the lower end of upper motor base 53. Gasket 69 may have an upward facing concave sealing surface 71. Coupling sleeve 67 is axially movable between an upper position shown in FIG. 2 to a lower position shown in FIG. 5. Motors 19 and 21 may be filled with dielectric fluid or lubricant 73 prior to connecting them. Prior to connecting motors 19, 21 to each other, coupling sleeve 67 will be in the lower position, with its lower end sealingly engaging sealing surface 71 of gasket 69, as shown in FIG. 5. The sealing engagement prevents lubricant 73 in upper motor bore 63 from leaking out while motors 19, 21 are vertically suspended until the connection between motors 19, 21 is made.

Referring again to FIG. 2, lower motor 21 has a bore 75 through which a lower motor shaft 77 extends. Lower motor shaft 77 protrudes past the upper end of neck 31, rotates about axis 41, and is fixed axially. A pin 79 or other obstruction is located within coupling sleeve 67 below the lower end of upper motor shaft 65. Pin 79 extends perpendicular to axis 41. When upper motor base 53 is stabbed into lower motor head 27, lower motor shaft 77 will contact coupling sleeve pin 79 and lift coupling sleeve 67 relative to upper motor shaft 65. The upward movement of coupling sleeve 67 releases the sealing engagement of coupling sleeve 67 with gasket 69, as shown in FIG. 2. Lubricant 73 in upper motor 19 is now free to communicate with lubricant in bore 75 of lower motor 21.

Lower motor head 27 contains a thrust bearing that includes a non rotating thrust bearing base 81. A thrust runner 83 rotates with lower motor shaft 77 by a key arrangement and rotatably engages thrust bearing base 81. Thrust bearing base 81 is supported on an upward facing shoulder 85 in bore 75 of lower motor head 27, a portion of which may be considered to be a thrust bearing support member. The engagement of thrust runner 83 with thrust bearing base 81 transfers downthrust imposes on lower motor shaft 77 to lower motor housing 25. Thrust runner 83 is located below neck 31.

Figure 6:
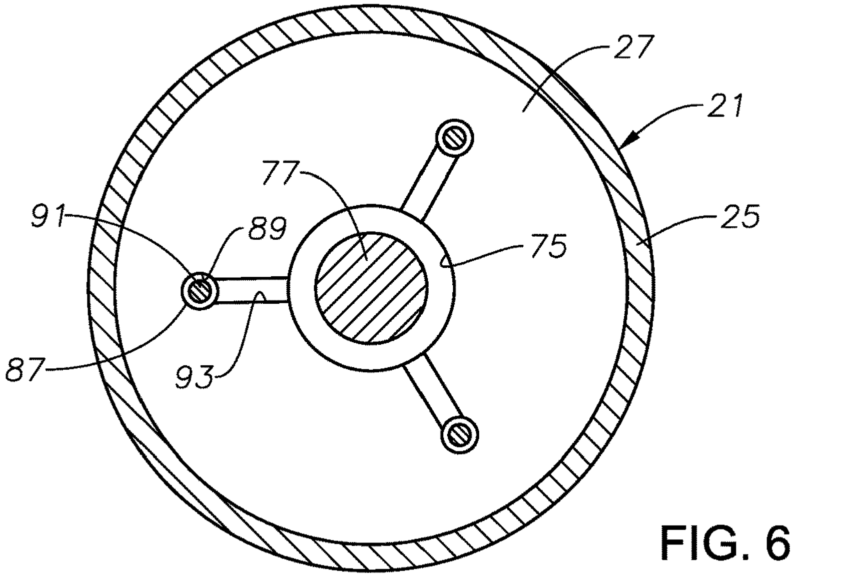
FIG. 6 is sectional view of the lower tandem motor taken along the line 6-6 of FIG. 2.

A plurality of electrical insulation tubes 87 (only one shown in FIG. 2) extend through motor wire holes 89 formed in lower motor head 27 radially outward from bore 75 and thrust runner 83 and parallel to axis 41. A motor wire 91 extends through each insulation tube 87. Referring to FIG. 6, normally there will be three insulation tubes 87 and three motor wires 91, one for each phase of a three phase motor. A radially extending slot 93 connects each motor wire hole 89 with bore 75. Each slot 93 has a width between its two parallel side walls that is at least equal to the diameter of each motor wire 91. The width of each slot 93 is less than the diameter of each wire hole 89. Each wire hole 89 and slot 93 has a lower end at the lower end of lower motor head 27 below thrust bearing base 81 and an upper end above thrust runner 37. The outer diameter of each insulation tube 87 is approximately the same as the diameter of each wire hole 89 and greater than the width of each slot 91.

During assembly of lower motor 21, after head 27 has been secured to lower motor housing 25, a worker will push motor wires 91 outward from bore 75 through slots 93 into wire holes 89. The worker then slides insulation tubes 87 around the upper ends of motor wires 91 and into wire holes 89. Insulation tubes 87 serve as retaining means to retain motor wires 91 in wire holes 89, preventing them from shifting radially inward into damaging contact with thrust runner 83.

Referring again to FIG. 2, a tubular insert member 95 fits within lower motor head 27 and is held by means such as a retaining ring 97. Insert member 95 has three holes 99 that register with wire holes 89 for lower motor wires 91. Each lower motor wire 91 has an electrical connection 101 that is illustrated as being male, but could be female. Each electrical connection 101 is mounted near the upper end of insert member 95.

Figure 7:
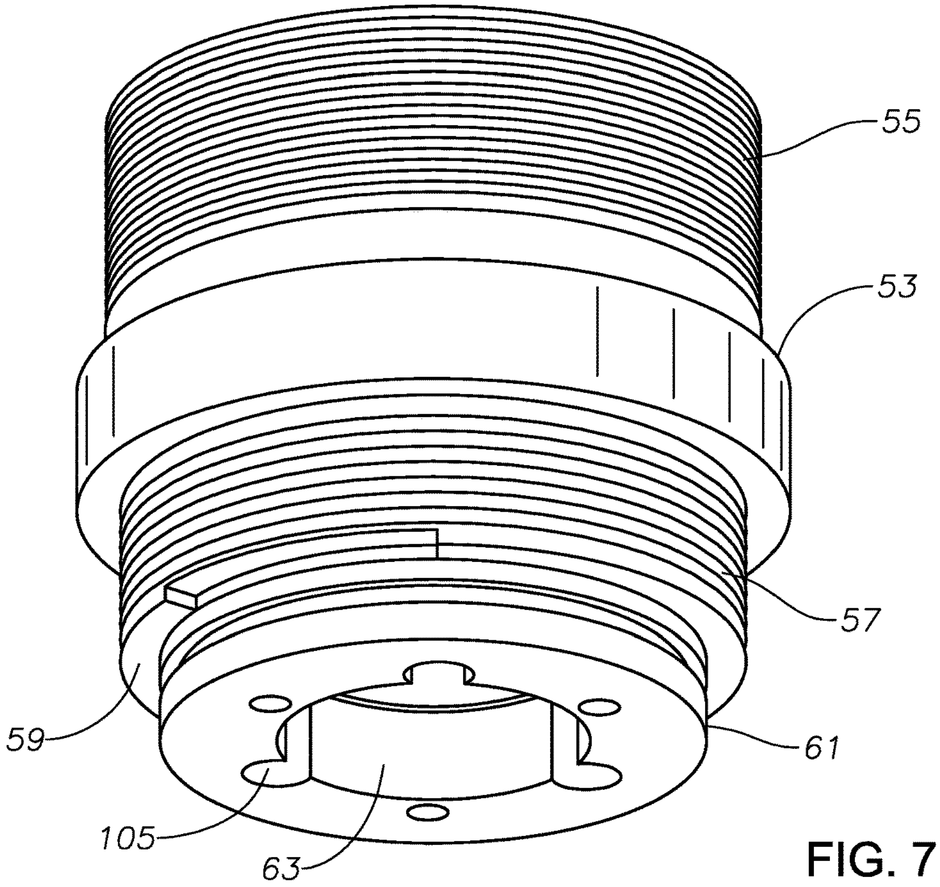
FIG. 7 is a perspective view of the base of the upper tandem motor, shown detached from the upper motor, and with the motor wires, insulation tubes, gasket and guide pins removed.

Upper motor base 53 has an insulation tube 103 installed within an upper motor wire hole 105. There are three upper motor wire holes 105, as shown in FIG. 7, each of which axially aligns with one of the lower motor electrical connections 101. Each upper motor wire hole 105 has an inner side that is open to upper motor base bore 63. An upper motor wire 107 extends through each insulation tube 103. Each insulation tube 103 and upper motor wire 107 form a seal within wire hole 105 to prevent leakage of lubricant through wire holes 105.

An upper motor electrical connection 109 is located at the lower end of each upper motor wire 107 for stabbing into electrical engagement with one of the lower motor electrical connections 101. A plurality of guide pins 111 are secured to upper motor base 53 and protrude downward. Each guide pin 111 enters a guide pin hole 113 formed in insert member 95 to orient the electrical connections 101 and 109.

While the disclosure has been shown in only one of its forms, it should be apparent to those skilled in the art that it is not so limited, but is susceptible to various changes without departing from the disclosure.

The invention claimed is:

1. An electrical submersible pump assembly, comprising:

a plurality of modules including a pump, at least one motor, and a pressure equalizer coupled to the motor for reducing a pressure differential between lubricant in the motor and hydrostatic pressure of well fluid;

a drive shaft subassembly extending from the at least one motor into the pump along a longitudinal axis of the pump assembly;

a threaded connection between first and seconds ones of the modules, comprising:

a first adapter mounted to the first one of the modules and having threads;

a second adapter mounted to the second one of the modules, the second adapter having a tubular body, a neck of smaller diameter than the body extending from the body, an external shoulder at a base of the neck, a rim on the neck, and an external groove between the external shoulder and the rim;

a collar rotatably carried and axially movable on the neck, the collar being in threaded engagement with the threads of the first adapter, the collar having an internal groove axially spaced and separated from a portion of the collar having threads; and a shoulder ring carried partly in the external groove and partly in the internal groove to retain the collar on the neck, the shoulder ring being split and biased into one of the internal or external grooves.

2. The pump assembly according to claim 1, wherein:

one of the internal or external grooves has a shallower depth portion and an adjoining deeper depth portion;

the shoulder ring is biased into an other of the internal or external grooves;

the collar has a disengaged position wherein the deeper depth portion is aligned with the other of the internal or external grooves and the shallower depth portion is misaligned with said other of the grooves, and an engaged position wherein the shallower depth portion is aligned with said other of the grooves and the deeper depth portion is misaligned with said other of the grooves; and wherein the shoulder ring is located partly in the deeper depth portion and said other of the grooves while the collar is in the disengaged position, and slides axially into the shallower depth portion while the collar moves axially to the engaged position.

3. The pump assembly according to claim 1, wherein:

the external groove has a shallower depth portion and an adjoining deeper depth portion;

the shoulder ring is biased into the internal groove;

the collar has a disengaged position wherein the internal groove is aligned with the deeper depth portion and the internal groove is misaligned with the shallower depth portion, and an engaged position wherein the internal groove is aligned with the shallower depth portion and misaligned with the deeper depth portion; and wherein the shoulder ring axially slides from the deeper depth portion to the shallower depth portion as the collar moves from the disengaged position to the engaged position.

4. The pump assembly according to claim 1, wherein:

the shoulder ring is biased radially outward relative to the axis;

a release hole extends radially from an exterior of the collar into the internal groove;

the shoulder ring is contractible in response to a tool inserted into the release hole and pressed radially inward against the shoulder ring; and when in a fully contracted position, an outer diameter of the ring is located radially inward from the internal groove to enable the collar to be axially removed from the neck.

5. The pump assembly according to claim 1, wherein:

the external groove has a shallower depth portion and an adjoining deeper depth portion;

the shoulder ring is biased into the internal groove;

the collar has a disengaged position wherein the internal groove is aligned with the deeper depth portion and the internal groove is misaligned with the shallower depth portion, and an engaged position wherein the internal groove is aligned with the shallower depth portion and misaligned with the deeper depth portion;

the shoulder ring axially slides from the deeper depth portion to the shallower depth portion as the collar moves from the disengaged position to the engaged position;

a release hole extends radially from an exterior of the collar into the internal groove;

the shoulder ring is contractible while the collar is in the disengaged position in response to a tool inserted into the release hole and pressed radially inward against the shoulder ring; and when in a fully contracted position, an outer diameter of the ring is located radially inward from the internal groove to enable the collar to be axially removed from the neck.

6. The pump assembly according to claim 1, wherein:

the drive shaft subassembly comprises a lower shaft in a lower one of the modules and an upper shaft in an adjacent and upper one of the modules, the lower and the upper ones of the modules being filled with a lubricant; and wherein the threaded connection further comprises:

a coupling sleeve having internal splines that engage a lower end of the upper shaft and an upper end of the lower shaft, the coupling sleeve being axially movable between a lower position prior to connecting the lower and upper ones of the modules, and an upper position when the lower and upper ones of the modules are connected;

a bore in the upper one of the modules in which the coupling sleeve is located; and a gasket in a lower end of the bore that is sealingly engaged by the coupling sleeve while the coupling sleeve is in the lower position to block leakage of lubricant from the upper one of the modules prior to connecting the upper and lower ones of the modules, the coupling sleeve being spaced above the gasket while in the upper position to communicate lubricant from the upper one of the modules past the gasket into the lower one of the modules.

7. The pump assembly according to claim 1, wherein:

said at least one motor comprises upper and lower tandem motors, each containing a lubricant;

the threaded connection is between the upper and lower tandem motors;

the drive shaft subassembly comprises a lower shaft in the lower tandem motor and an upper shaft in the upper tandem motor; and the threaded connection further comprises:

a coupling sleeve having internal splines that engage the lower end of the upper shaft and the upper end of the lower shaft, the coupling sleeve being axially movable between a lower position prior to connecting the lower tandem motor with the upper tandem motor, and an upper position when the upper and lower tandem motors are connected;

a bore in the upper tandem motor in which the coupling sleeve is located; and a gasket in a lower end of the bore that is sealingly engaged by the coupling sleeve while the coupling sleeve is in the lower position to block leakage of lubricant from the upper tandem motor, the coupling sleeve being spaced above the gasket while in the upper position to communicate lubricant from the upper tandem motor to the lower tandem motor.

8. The pump assembly according to claim 1, wherein:

said at least one motor comprises upper and lower tandem motors, each of the upper and lower tandem motors having a plurality of motor wires terminating in electrical connectors at the lower end of the upper tandem motor and the upper end of the lower tandem motor, the threaded connection being between the upper and lower tandem motors;

wherein the pump assembly further comprises:

a thrust bearing support member in the lower tandem motor and having a central counterbore;

a thrust bearing located in the counterbore of the thrust bearing support member;

a plurality of motor wire holes extending axially through the thrust bearing support member and spaced radially outward from the counterbore, the motor wires of the lower tandem motor extending through the motor wire holes; and a plurality of slots extending radially from the motor wire holes to the counterbore, each of the slots having an axial length at least equal to an axial length of each of the motor wire holes, each of the slots having a width greater than a diameter of each of the motor wires of the lower tandem motor.

9. The pump assembly according to claim 1, further comprising:

a tube extending through each of the motor wire holes, each of the motor wires of the lower tandem motor extending through one of the tubes; and each of the tubes having an outer diameter greater than the width of each of the slots.

* * * * *